United States Patent [19]

Hashimoto et al.

[11] Patent Number: 5,006,934
[45] Date of Patent: Apr. 9, 1991

[54] COPYING MACHINE CAPABLE OF STORING IMAGE DATA

[75] Inventors: Kaoru Hashimoto, Hyogo; Toshikazu Kawaguchi; Hirofumi Hasegawa, both of Osaka, all of Japan

[73] Assignee: Minolta Camera Kabushiki Kaisha, Osaka, Japan

[21] Appl. No.: 469,690

[22] Filed: Jan. 26, 1990

Related U.S. Application Data

[63] Continuation of Ser. No. 304,226, Jan. 31, 1989, abandoned.

[30] Foreign Application Priority Data

Feb. 1, 1988 [JP] Japan .................. 63-21647

[51] Int. Cl.5 .............................................. G03G 15/00
[52] U.S. Cl. ................................. 358/296; 358/401; 355/209; 346/160
[58] Field of Search ............... 355/209, 202, 206, 75; 358/296, 300, 401; 346/153.1, 160

[56] References Cited

U.S. PATENT DOCUMENTS

| | | | |
|---|---|---|---|
| 4,251,153 | 2/1981 | Levine | 358/300 X |
| 4,384,272 | 5/1983 | Tanaka et al. | 382/50 |
| 4,477,175 | 10/1984 | Snelling | 358/300 X |
| 4,562,485 | 12/1985 | Maeshima | 358/296 X |
| 4,597,018 | 6/1986 | Sonobe et al. | 358/296 |
| 4,655,577 | 4/1987 | Ikuta | 358/296 X |
| 4,752,808 | 6/1988 | Lemelson | 358/300 |
| 4,797,706 | 1/1989 | Sugishima et al. | 358/300 |
| 4,802,229 | 1/1989 | Yamada | 355/206 |

FOREIGN PATENT DOCUMENTS

47-11451  4/1972  Japan .
55-33151  3/1980  Japan .

*Primary Examiner*—R. L. Moses
*Attorney, Agent, or Firm*—Burns, Doane, Swecker & Mathis

[57] ABSTRACT

When a print switch is pressed, the color of the switch changes from green to orange. A wait indication prohibiting removal of an original placed on a platen glass is turned on. When reading of original images by an image reader is finished, the wait indication is turned off, permitting the removal of the original. Meanwhile, the color of the print switch is kept as it is until the end of image formation on a paper. The color of the print switch is turned into green when the image formation is finished, and the copying machine is returned to a stand-by state. Therefore, the next original can be set before the end of image formation, and the copying operation can be facilitated.

9 Claims, 11 Drawing Sheets

ORIGINAL(NAIN SCANNING DIRECTION) AREA    MARK AREA

COPYING MACHINE CAPABLE OF STORING IMAGE DATA

This application is a continuation of application Ser. No. 304,226, filed Jan. 31, 1989 now abandoned.

BACKGROUND OF THE INVENTION

1. Field of the Invention

The present invention relates to a copying machine and, more specifically, to an improvement in a copying operation of a digital copying machine having a digital page memory.

2. Description of the Related Art

In providing multiple copies of an original by means of an analog copying machine having no digital page memory, the original can not be changed until the last copied paper is provided.

More specifically, a back light of a print switch is adapted to be orange from the start of the copying operation to the end of the last scanning, and the exchange of the original for the next copying operation is permitted when the back light is changed from orange to green. The reason for this is that the scanning operation and therefore the original, is necessary for carrying out the last printing operation, since the scanning operation and the printing operation are in one to one correspondence with each other.

The foregoing is, in an aspect, derived from the fact that an analog copying machine generally has no memory to store read image data.

Meanwhile, in a digital copying machine having a page memory, only one print switch is provided and the color thereof does not change until the end of the last printing operation, as in the above described analog copying machine. Accordingly, whether the copying machine is carrying out the scanning operation or the printing operation can not be determined from outside. Especially when the copying operation is in a multicopy mode, the exchange of originals can not be effectively carried out.

SUMMARY OF THE INVENTION

One object of the present invention is to facilitate copying operation in a copying machine capable of storing image data.

Another object of the present invention is to effectively carry out multiple copying operation in a copying machine capable of storing image data.

A further object of the present invention is to effectively carry out continuous multicopy operations in a copying machine capable of storing image data.

A still further object of the present invention is to carry out continuous multiple copying operations without unnecessary waiting period.

In order to attain the above described objects, a copying machine according to a broad aspect of the present invention comprises, a platen; image reading means; memory means; image forming means; prohibiting means and releasing means. An original is arbitrarily placed on the platen. The image reading means reads images of the original placed on the platen. The memory means stores image data read by the image reading means. The image forming means forms images based on the image data stored in the memory means. The prohibiting means prohibits removal of the original placed on the platen when the image reading means is in an activated state. The releasing means releases the prohibition of removal of the original by the prohibiting means when the reading by the image reading means is finished.

In order to attain the above described objects, a copying machine according to an aspect of the present invention comprises, a platen; image reading means; memory means; image forming means; first indicating means and second indicating means. An original is placed on the platen. The image reading means comprises a one dimensional image sensor and scanning means for reading images of the original placed on the platen. The memory means stores image data corresponding to the images read by the image reading means. The image forming means forms images based on the image data stored in said memory means. The first indicating means indicates that the image reading means is carrying out reading operation. The second indicating means indicates that the image forming means is carrying out image forming operation.

The copying machine structured as described above is very convenient as it enables exchange of originals as soon as the image reading is finished and there is no need to wait for the end of image formation. Especially when multiple copies are to be provided, unnecessary waiting time can be reduced, since the succeeding originals can be set immediately.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
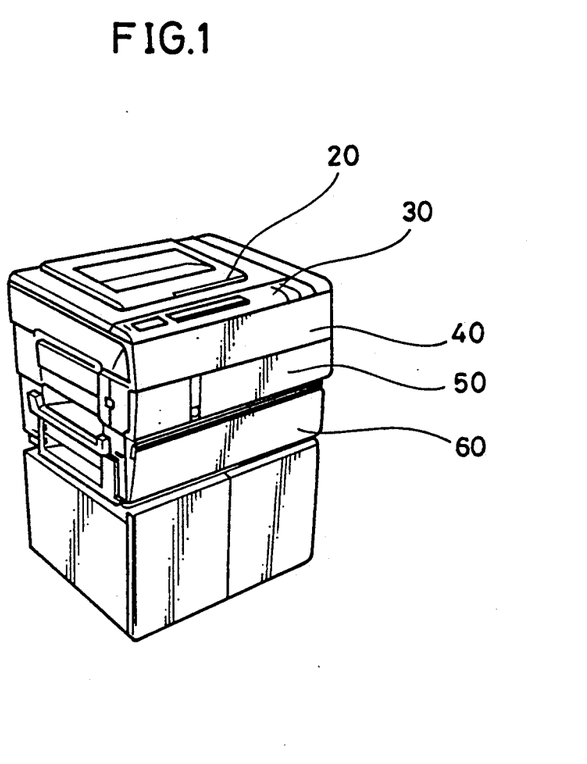
FIG. 1 is a perspective view showing an appearance of a copying machine in accordance with one embodiment of the present invention.
Figure 2:
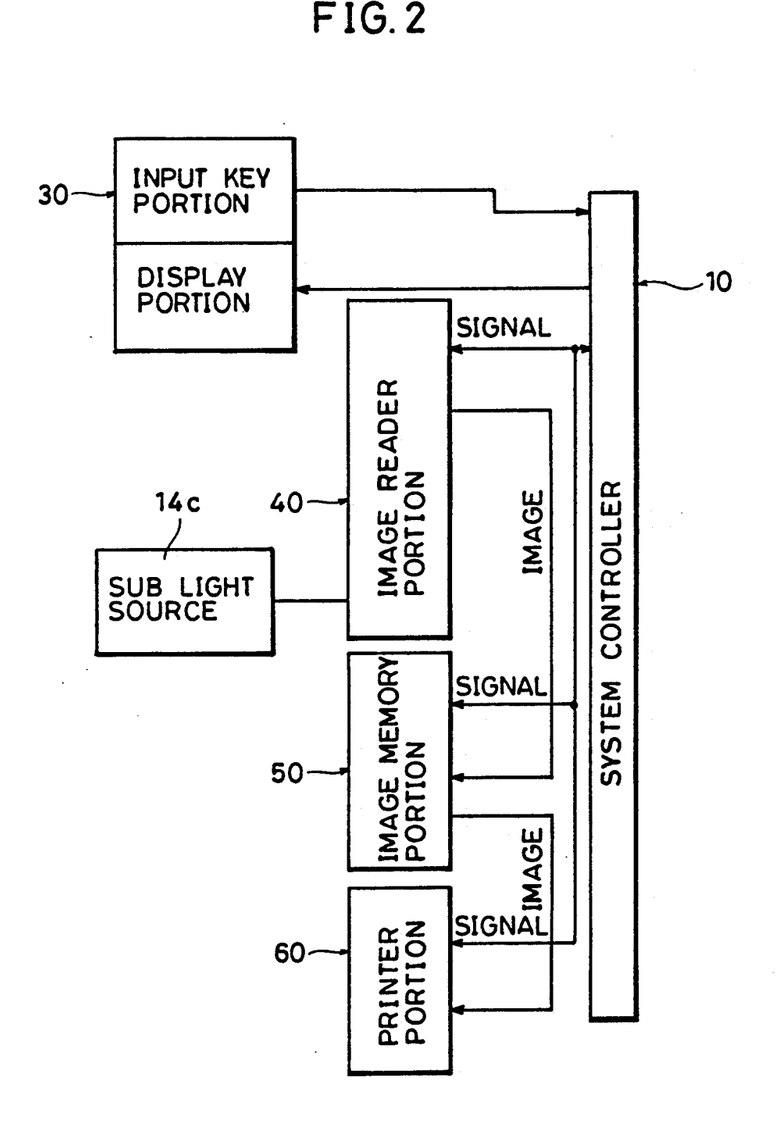
FIG. 2 is a block diagram showing a control system of the copying machine of FIG. 1.

FIG. 1 is a perspective view showing a digital copying machine as a whole having a page memory in accordance with one embodiment of the present invention and FIG. 2 is a block diagram showing the control of FIG. 1.

Referring to FIGS. 1 and 2, an operation panel 30 for determining the contents of the copying operation and column skip levers (or index levers) 20 for setting image areas to be read are arranged on an upper surface of a body of the copying machine. An image reader portion 40 for reading images is arranged in the upper portion of the copying machine. An image memory portion 50 for storing the read image data is provided at the central portion of the copying machine, and a printer portion 60 for providing a copy on a fed paper based on the image data stored in the image memory portion 50 is arranged therebelow. The operation panel 30 comprises an input key portion and display portions. The operation panel 30, the image reader portion 40, the image memory portion 50 and the printer portion 60 are connected to a system controller 10 to exchange signals with each other. The system controller 10 applies and receives signals to and from these portions to control the copying machine as a whole. A sub light source 14c for irradiating a platen glass is connected to the image reader portion 40 in order to facilitate the operation of the column skip levers 20.

Figure 3:
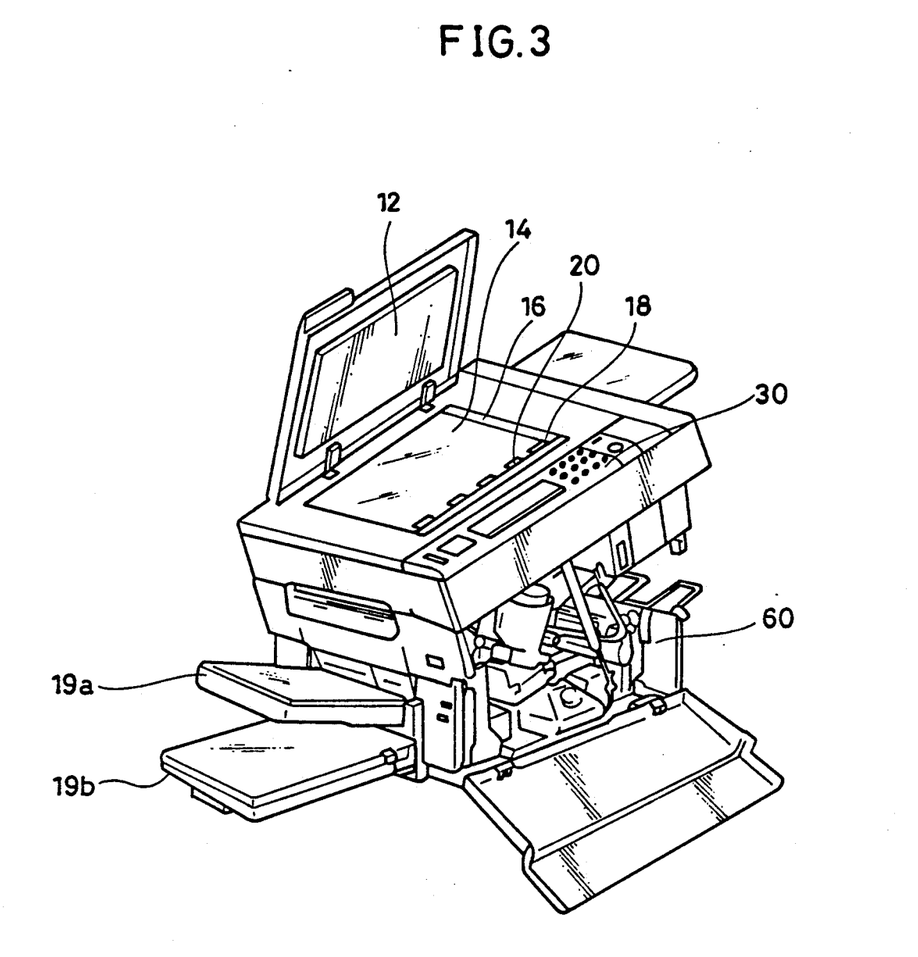
FIG. 3 is an exploded perspective view centered on the platen glass of the copying machine of FIG. 1.

FIG. 3 is an exploded perspective view of the copying machine of FIG. 1 centered on the platen glass. Referring to the figure, an original width scale 16 for measuring the width of the original is arranged at an end portion of the platen glass 14. Column skip levers 20 are arranged at an end portion of the platen glass 14 on the side of the operation panel. An original cover 12 is attached to the upper surface of the copying machine by means of hinges for covering placed originals. The column skip levers 20 may be set at arbitrary positions with reference to an original length scale provided on an front portion of the platen glass 14. Two paper feed cassettes 19a and 19b containing papers to be fed are detachably attached to the side surface of the printer portion 60.

Figure 4:
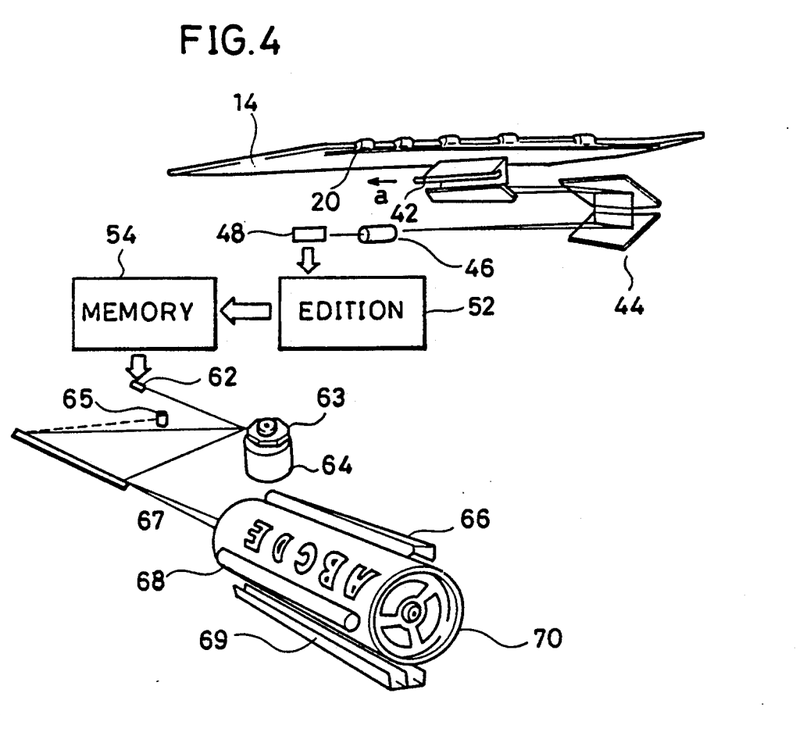
FIG. 4 is a schematic diagram showing the optical system of the copying- machine shown in FIGS. 1 and 3.

FIG. 4 illustrates a schematic structure of the image reader portion 40, the image memory portion 50 and the printer portion 60 below the platen glass 14 shown in FIG. 3.

Referring to the figure, images of an original placed on the platen glass 14 are scanned by a scanner 42 in the direction of arrow "a". The direction of arrow "a" will be defined as a subsidary scanning direction. The light reflected from the scanned original images is condensed and it passes through a mirror 44 and a condenser lens 46 to enter a CCD array 48. The CCD array 48 has a plurality of CCD elements disposed in the direction perpendicular to the subsidiary scanning direction. That direction will be defined as a main scanning direction. The light reflected from the original images is successively read by each CCD element of the CCD array 48. The output data read by the CCD 48 are edited by an editing portion 52 carrying out editing operation such as deletion, change of magnification rate and so on. The edited output data are inputted to a page memory (bit map memory) 54 to be stored therein. The image data stored in the memory 54 are outputted as laser pulses through a laser diode 62. The laser pulses are reflected by a polygon mirror 63 whose rotation controlled by a driving motor 64 to form latent electrostatic images on a photoreceptor 70, with a sensor 65 detecting a start position of scanning being a reference. The photoreceptor 70 is charged to have a prescribed potential by means of a charging portion 66 in advance. The latent electrostatic images formed by the laser pulses are developed in a developing portion 68 and transferred onto a prescribed fed paper in a transferring portion 69.

Figure 5:
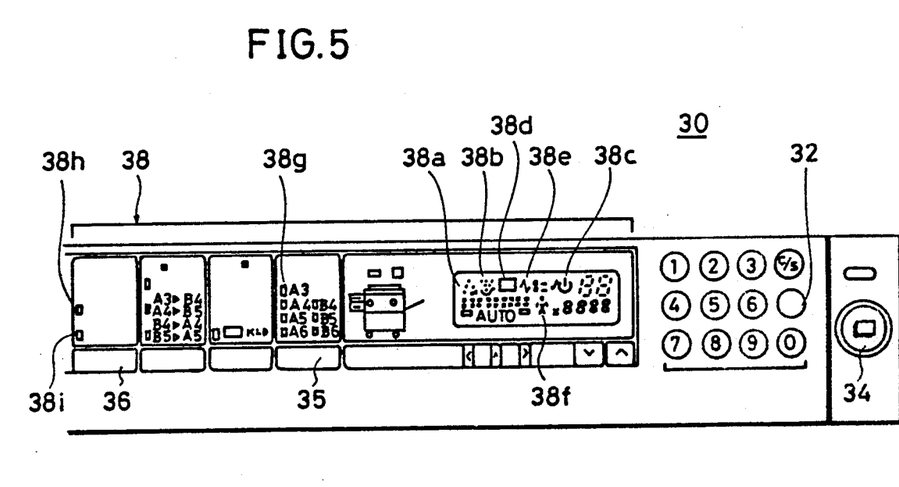
FIG. 5 is a plan view of an operation panel arranged on the upper surface of the machine of FIG. 1.

FIG. 5 is a plan view of the operation panel 30 shown in FIG. 1 which comprises an input key portion having buttons and key input portions, and a display portion. Both of the portions are the same as those of a common copying machine. In the input key portion arranged are: a reduction button; an equal scale magnification button; a paper selecting button 35; a paper feed inlet button; an exposure adjusting button; an exposure selecting button; a magnification rate correcting button; a numerical value setting button; a printing button 34; an all-reset button; and a clear stop button. A column skip mode button 36 and an original illumination button 32 are further provided.

The printing button 34 builds in an orange lamp for mainly indicating that the machine is in printing operation and in a green lamp for indicating that the machine is not in printing operation.

The display portion 38 comprises: a paper inlet display; a paper size display 38g; a copy number display; a display 38h of automatic paper size selection mode; a display 38i of manual paper size selection mode; a magnification rate display; and a display of exposure. Further provided are a toner empty display 38a; a display 38b indicating that a withdrawn toner bottle is full; a display 38c indicating that the machine is not being heated to a prescribed temperature; a display 38d indicating paper empty; a display 38e indicating a jam; and a display 38f indicating an accident.

The said display 38c is further used as an indication for indicating that the original can not be exchanged, namely the original is under the reading operation.

In accordance with one embodiment of the present invention, only the image data read by the image reading portion 40 in the range designated by the levers 20 are inputted into the memory 53. Thereafter, the image data are outputted from the memory 54 to the printer portion 60. Consequently, a copy is provided in which only the necessary portions of the images are copied, for example a copy of one's resident register or one's family register.

Figure 6:
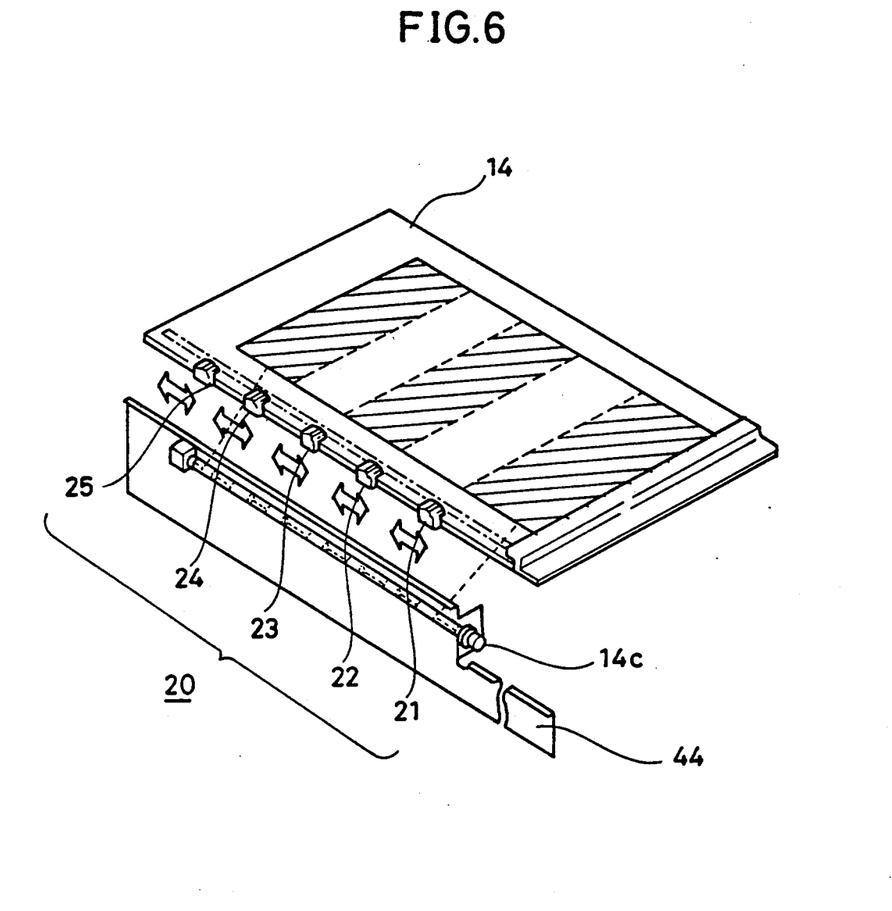
FIG. 6 is a perspective view showing the arrangement of the platen glass and column skip levers of FIG. 1.
Figure 7:
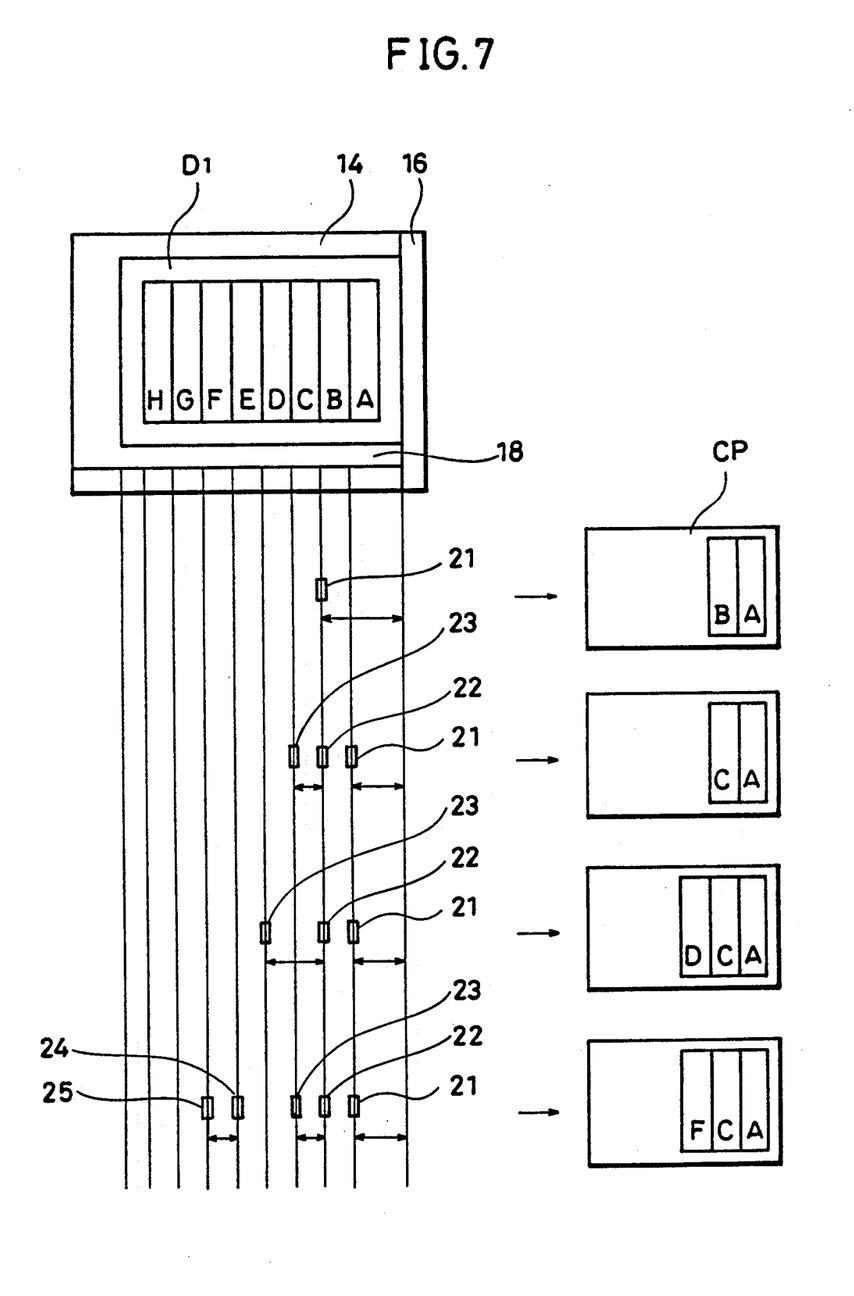
FIG. 7 illustrates the manner of column skip edition employing the column skip levers in accordance with one embodiment of the present invention.

The designation of the area to be edited is carried out by sliding five column skip levers 21 to 25 provided on the platen glass as shown in FIG. 6. Referring to the figure, areas between the levers 21 and 22, the levers 23 and 24 and an area behind the lever 25 are invalid areas. The area in front of the lever 21 and the areas between the levers 22 and 23 and the levers 24 and 25 (hatched areas) are copy areas. Therefore, the desired image areas are copied continuously, as shown in FIG. 7.

In FIG. 6, a sub light source 14c and a reflecting plate 44 for the sub light source 14c provided along the lower side of the levers 21 to 25 are shown. The sub light source 14c is turned on for a prescribed time period by pressing an original illumination button 32 when the column skip edition is to be carried out, so that the images of the original D1 can be seen through the rear surface, thereby facilitating setting of the levers 21 to 25.

Figure 8:
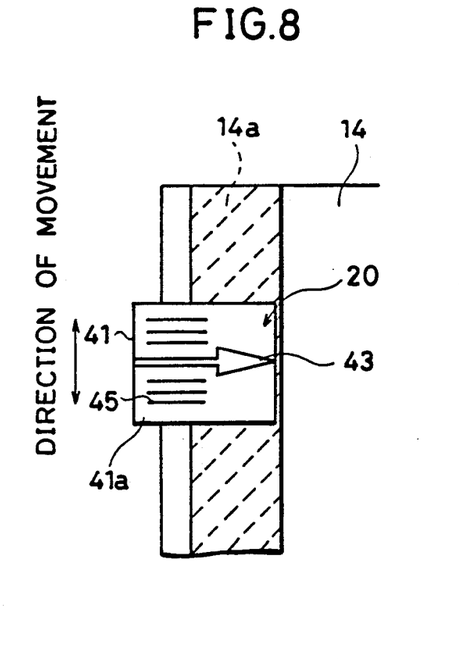
FIG. 8 is an enlarged plan view of the column skip lever of FIG. 6.
Figure 9:
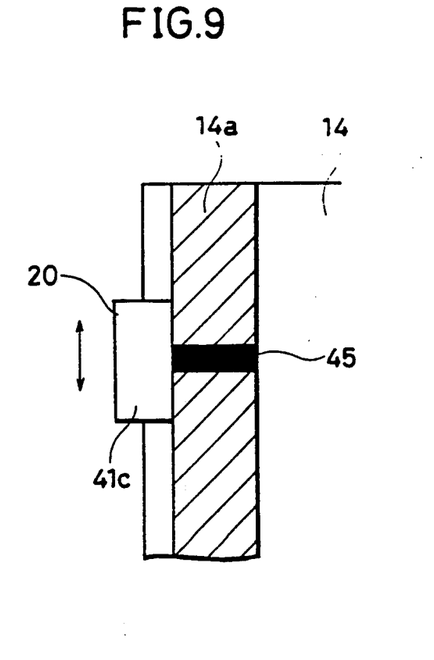
FIG. 9 is a plan view showing the rear surface of the column skip lever of FIG. 8.
Figure 10:
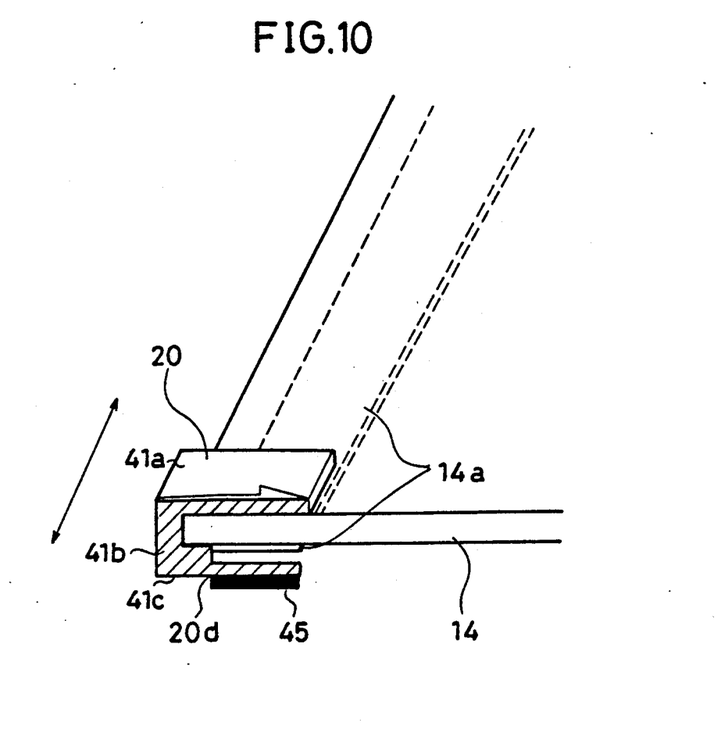
FIG. 10 is a perspective cross sectional view showing a cross section of the central portion of the column skip lever shown in FIG. 8.

FIGS. 8 and 9 are plan view and bottom view, respectively, showing the column skip lever 20 which is enlarged for convenience, and FIG. 10 is a cross sectional perspective view showing the cross section of the central portion of the lever 20.

The lever 20 comprises a lever body 41 including an upper piece 41a, a central piece 41b and a lower piece 41c which is shorter than the upper piece 41, and a black marker 45 fixed to an end portion of the lower piece 41c.

The lever body 41 sandwiches the platen glass 12 by means of the upper piece 41a and the lower piece 41c and it is movable along an end portion in that state. An arrow 43 for facilitating exact positioning and convex stripes for facilitating easy movement of the lever 20 by one's finger are formed on the upper surface of the upper piece 41a.

A white reflecting tape 14a is applied at a portion corresponding to the track of the marker 45 on the lower surface of the platen glass 14. The positions of the reflecting tape 14a and of the marker 45 in the scanning direction which are the same as the reading position of the original D1 are irradiated by the halogen lamp during scanning of the scanner 42. Therefore, when the scanner 41 reaches the position of the marker 45, the light reflected therefrom is considerably reduced. By detecting the change of the reflected light, the positions of the levers 21 to 25 can be detected.

A space 20d is provided in order to prevent contact between the white tape 14a and the marker 45. This is in order to prevent erroneous detection caused by a flaw on the white tape 14a and to prevent erroneous detection caused by dust attracted on the tape by static electricity derived from the contact.

In this manner, during main scanning of the CCD, sub scanning (scanner) is carried out reading the white tape portion, and when an edge of the black marker 45 is detected during the sub scanning, the sub scanning is carried out for a prescribed width and thereafter writing of data to the memory is stopped. Thereafter, when an edge of a second black marker is detected and the sub scanning is carried out for the said prescribed width, the writing of the data into the memory is started again.

Figure 11:
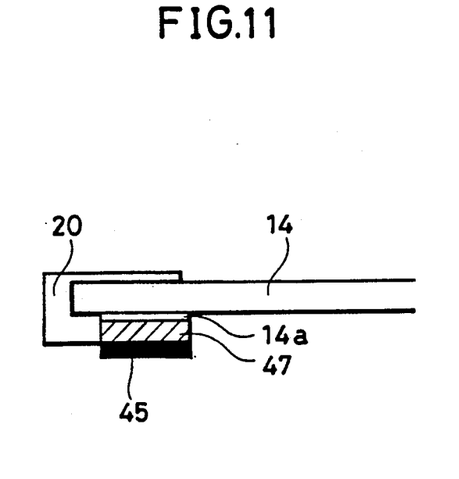
FIG. 11 shows another example of the column skip lever of FIG. 6.

FIG. 11 shows another example of the column skip lever. Referring to the figure, a buffer member 47 is interposed between the white tape 14a and the marker 45. The member 47 is formed of a felt or a conductive sponge having a function of eliminating charges. A paint may be used instead of the white tape 14a. Any other color providing distinctive output difference from the marker during image scanning can be used.

Figure 12:
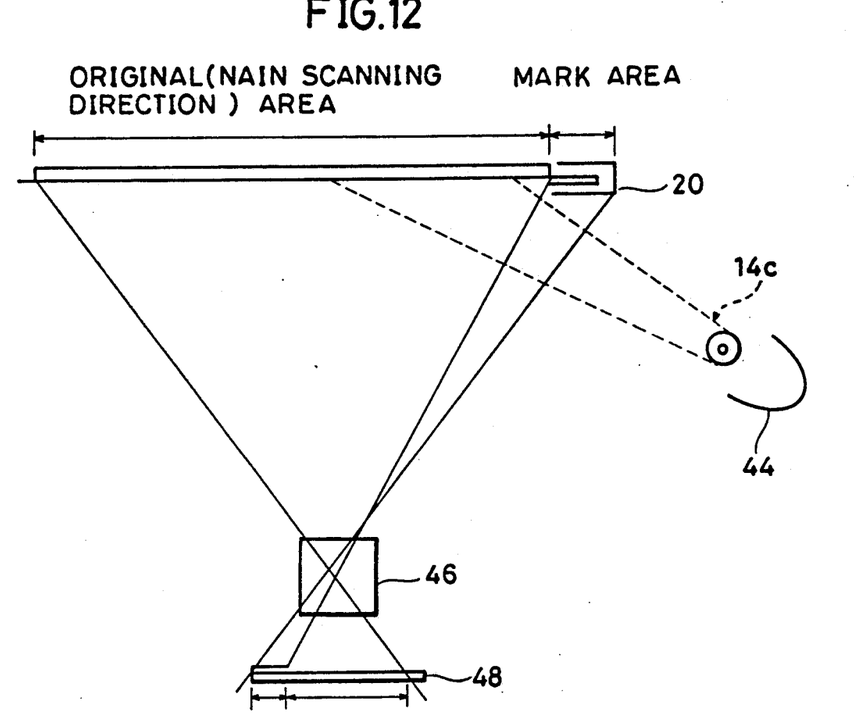
FIG. 12 is a schematic diagram showing a structure of one embodiment of the present invention including a sub light source or an original illuminating lamp.
Figure 13:
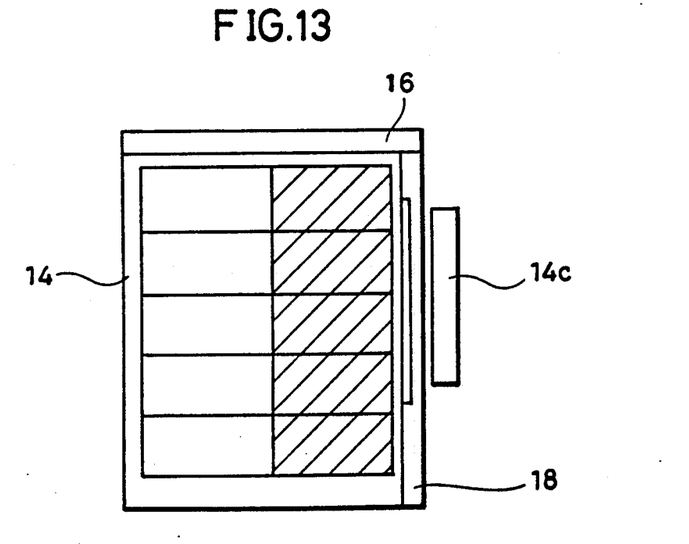
FIG. 13 is a plan view of an original irradiated by the sub light source of FIG. 12.

FIG. 12 is a schematic diagram showing a structure including a sub light source or an original illuminating lamp and FIG. 13 illustrates an original irradiated by the sub light source. By using a sub light source 14c as shown in the figure in addition to a light source, not shown, for exposing and scanning the original to irradiate not necessarily the entire surface of the original but a portion of the original near the moving range of the lever 20 (hatched portion) the contents of the original can be seen through, so that the moving operation of the lever 20 can be facilitated.

Figure 14:
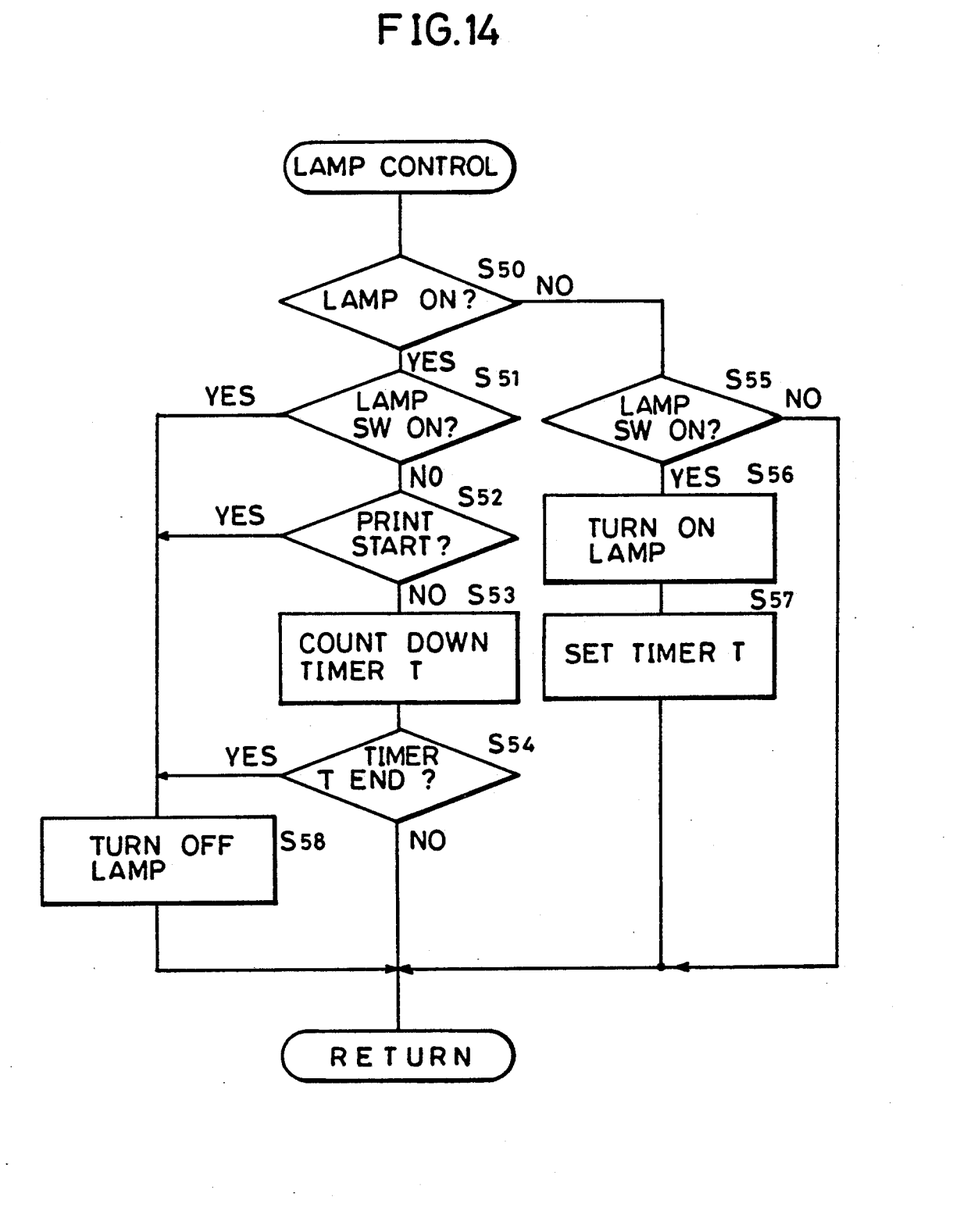
FIG. 14 is a flow chart of controlling the operation of the sub light source shown in FIG. 12.

FIG. 14 is a flow chart showing an example of control of the operation of the sub light source.

Referring to the flow chart, when the sub light source 14c or the lamp is OFF (NO in S50), and an original illuminating button 32 on the operation panel 30 shown in FIG. 5 is turned ON (YES in S55), then the lamp is turned on (S56) and a timer T is set (S57). When the lever 20 is operated and if the lamp is still ON (YES in S50) at that time, then the button 32 is pressed to turn the lamp off(S58). Alternatively, when the printing operation is started by a button 34 while the lamp is ON (YES in S52), the lamp is turned OFF. While the lamp is ON, the count of the timer T is decremented (S53), and the lamp is turned off when the counting of the timer T is ended (YES in S54).

The timer and the control means such as described above are incorporated in the system controller 10 and the image reader portion 40 shown in FIG. 2.

The opening and closing of the original cover 12 may be detected in order to automatically turn on the sub light source 14c when the cover is opened and to automatically turn off the light source 14c when it is closed.

In a digital copying machine having a page memory such as shown in FIGS. 1, 2 and 4, only one scanning is necessary for reading original images in providing multiple copies from one original. The copies of the required number are provided by carrying out a plurality of copying operations with latent electrostatic images formed on a photoreceptor based on the image data read from the page memory.

More specifically, in carrying out the above described multiple copying, the original may be exchanged after the end of one original image reading operation.

Figure 15:
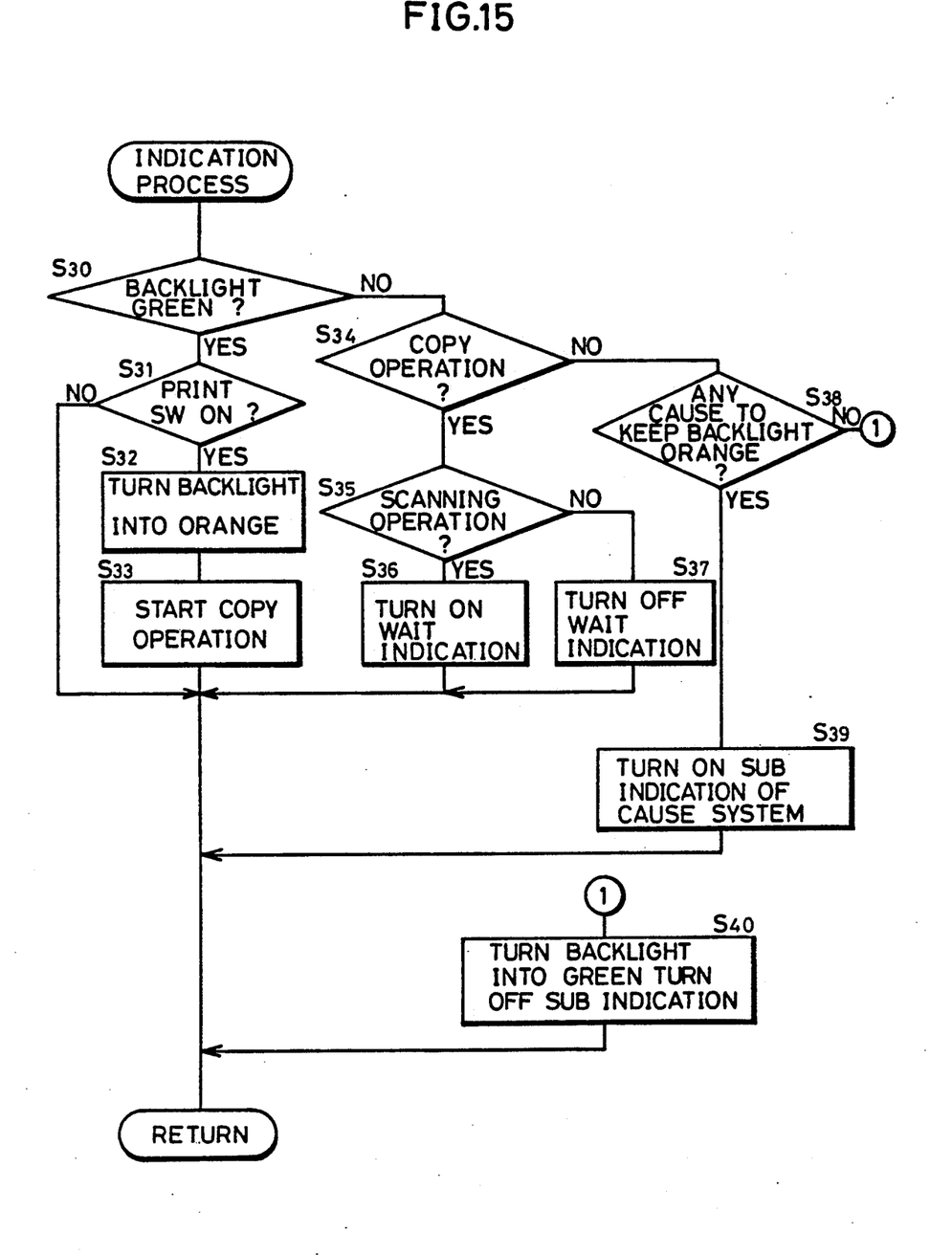
FIG. 15 is a flow chart showing the contents of an indicating process in accordance with one embodiment of the present invention.

FIG. 15 is a flow chart showing an example of an indicating process by the system controller shown in FIG. 2.

When the print switch is green, namely, when the operation of the print switch 34 is permitted (YES in the step S30) and an ON edge of the print switch is detected (YES in the step S31), the back light of the print switch is turned into orange (step S32), the copying operation is started and a copy flag is set (step S33). When the back light is orange (NO in the step S30) and the machine is not in the copying operation (NO in the step S34), the reason why the back light is orange is detected by a control system and whether the cause is to be indicated or not is determined (step S38). Now, "copying operation" in this context corresponds to a time period from the turning on of the print switch 34 to the end of copying on the last paper. If it is determined that the cause is to be displayed (YES in the step S38), toner empty display 38a, a display 38b indicating that the withdrawn toner bottle is full, a display 38c indicating that temperature adjustment is carrying out (it is kept on until a heat roller is heated to a prescribed temperature), a paper empty display 38d, a jam display 38e, a trouble display 38f or the like is simultaneously turned on (sub display of the cause system, step S39). If it is determined that the cause is not to be displayed (NO in the step S38), the next copying operation is available, therefore the back light of the print switch is turned into green, and the sub display of the cause system is turned off (step S40).

When the machine is in the copying operation, namely, when the copy flag is set (YES in the step S34), whether the scanning is being carried out or not is determined (step S35). If the scanning is being carried out (YES in the step S35), a wait indicating mark 38c prohibiting the exchange of originals is turned on (step S36). If the scanning is not being carried out, namely, if the scanning has been completed (NO in the step S35), the wait indicating mark 38c is turned off (step S37) to indicate that the original can be exchanged. The copy flag is set off when the copying on the last paper is finished, and thereafter the same process is carried out.

In a common analog copying machine, the optical system or a slider is driven at every image formation to expose the images on the photoreceptor. During multiple copying, the back light of the switch 34 is turned into green when the last exposure is finished, thereby informing the user that the original can be exchanged, and permitting the next copying.

Meanwhile, in a digital copying machine, the image data are once stored in a memory. Thereafter, the copying operation is carried out with images exposed by laser on the photoreceptor based on the memory data. Therefore, only one reading operation of the original images by the optical system is necessary. However, the next copying operation can not be permitted until the end of laser exposure on the photoreceptor for the last paper. Accordingly, the back light of the print switch 34 is turned from orange into green when the last exposure is finished, permitting the reception of the next copy (steps S34, S38 and S40).

In this state, since only one scanning operation is carried out by the optical system to store the image data in the memory as described above, the original can be changed after the end of the scanning even when multiple copies are being provided.

When an operation requiring much time is necessary for setting editing positions as in the case of the column skip edition, the operation efficiency will be increased if this operation is carried out in parallel with the printing operation. Therefore, it is very effective to inform the user of the time when the exchange of originals is permitted (by turning ON/OFF of a wait indication) independent from the back light of the print switch 34.

In this embodiment, when the print switch 34 is turned on, the back light is turned into orange, and only during the image reading operation, the wait mark 38c is kept on. Accordingly, the user can determine whether the original may be changed or not. Although a wait mark is separately provided in the above embodiment, the permission of the exchange of the originals may be indicated by a change of state of the print switch from continuous on state to flickering or from flickering to the continuous on state.

In addition, the time for exchanging the original is indicated by the wait mark in the above embodiment, means for prohibiting exchange of the original such as means for prohibiting opening of the original cover, may be separately provided, or such means may be provided in addition to the wait mark.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine, comprising:
    a platen on which an original is placed;
    image reading means having a one-dimensional image sensor and scanning means for reading images of the original placed on said platen;
    memory means for storing image data corresponding to the images read by said image reading means;
    image forming means for forming images based on the image data stored by said memory means;
    first indicating means for indicating that said image reading means is carrying out reading operation; and
    second indicating means for indicating that said image forming means is carrying out image forming operation.

2. A copying machine according to claim 1, further comprising
    mode designating means for designating a mode in which said image forming means are activated a plurality of times based on the image data stored in said memory means, wherein
    said image reading means is activated once in response to a designating output of said mode designating means, and indication of said first indicating means is released after the end of the reading operation of said image reading means.

3. A copying machine according to claim 1, further comprising:
    area designating means for designating a plurality of areas of the original placed on said platen; and
    control means for controlling said memory means such that only image data corresponding to the areas designated by said area designating means out of the images read by said image reading means are stored by said memory means.

4. A copying machine according to claim 3, wherein said area designating means comprises
    at least two index members arranged on an end portion of said platen along a scanning direction of said scanning means, said members movable in said scanning direction, and
    detecting means for detecting a position of each of said index members; and
    said control means responsive to a detection from said detecting means, controls said memory means such that image data of the original included in a scanning area scanned by said scanning means sandwiched by two of said index members are removed, and image data of the original included in an area scanned before said sandwiched area and an area scanned after said sandwiched area are continuously stored.

5. A copying machine according to claim 4, wherein each of said index members has a mark on the rear surface, said scanning means scanning said original as well as said mark for projecting an image of said mark to said image sensor.

6. A copying machine, comprising:
    a platen on which an original is placed;
    image reading means for reading images of the original placed on said platen;
    memory means for storing image data read by said image reading means;
    image forming means for forming images based on the image data stored in said memory means;
    prohibiting means for prohibiting, when said image reading means in an activated state, removal of the original placed on said platen; and
    releasing means for releasing, when reading by said image reading means is finished, prohibition of removal of the original by said prohibiting means.

7. A copying machine according to claim 6, further comprising
    instructing switch for instructing activation of said image reading means;
    first indicating means capable of switchably indicating a first state in which said image forming means is in active and a second state in which said image forming means is not in active; and second indicating means capable of switchably indicating a first state in which said prohibiting means is in active and a second state in which said prohibiting means is not in active; wherein said first and second indicating means, responsive to an instruction output of said instructing switch, change from the second state to the first state, said releasing means changes the indication of said second indicating means from said second state to said first state.

8. A copying machine according to claim 7, wherein said first indicating means changes from said first state to said second state when image formation by said image forming means is finished.

9. A copying machine according to claim 7, further comprising mode designating means for designating a mode in which said image forming means is activated a plurality of times based on the image data stored in said memory means; wherein said image reading means is activated once in response to a designation output from said mode designating means.

* * * * *